United States Patent [19]
Girard

[11] Patent Number: 5,385,377
[45] Date of Patent: Jan. 31, 1995

[54] PICKUP TRUCK BED COVERS AND ATTACHMENT SYSTEM THEREFORE

[75] Inventor: Randall Girard, LaSalle, Canada

[73] Assignee: Canvasback Convertible Tops Inc., Windsor, Canada

[21] Appl. No.: 958,299

[22] Filed: Oct. 8, 1992

[51] Int. Cl.⁶ ............................................. B60P 7/02
[52] U.S. Cl. .................................. 296/36; 296/100; 296/108; 296/111; 296/122
[58] Field of Search ............... 296/32, 34, 36, 100, 296/108, 109, 111, 122, 165, 173, 26, 27

[56] References Cited

U.S. PATENT DOCUMENTS

| | | | |
|---|---|---|---|
| 3,373,464 | 3/1968 | Ausnit | 24/576 |
| 3,727,972 | 4/1973 | Belk | 296/100 |
| 4,036,521 | 7/1977 | Clenet | 296/100 |
| 4,061,394 | 12/1977 | Vodin | 296/100 |
| 4,273,377 | 6/1981 | Alexander | 296/100 |
| 4,479,677 | 10/1984 | Gulette et al. | 296/98 |
| 4,573,730 | 3/1986 | Gondert et al. | 296/180.1 |
| 4,730,866 | 3/1988 | Nett | 296/100 |
| 4,756,571 | 7/1988 | Lake | 296/100 |
| 4,792,178 | 12/1988 | Kokx | 296/98 |
| 4,792,179 | 12/1988 | Stevens | 296/100 |
| 4,838,602 | 6/1989 | Nett | 296/100 |
| 4,861,092 | 8/1989 | Bogard | 296/100 |
| 4,936,724 | 6/1990 | Dutton | 410/110 |
| 4,964,669 | 10/1990 | Geier | 296/100 X |
| 4,979,776 | 12/1990 | Schweickert | 296/100 |
| 4,991,640 | 2/1991 | Verkindt et al. | 160/368.1 |
| 5,058,652 | 10/1991 | Wheatley et al. | 160/327 |
| 5,238,288 | 8/1993 | Chandler | 296/100 |

FOREIGN PATENT DOCUMENTS 2004224  8/1990  Canada.

Primary Examiner—David M. Mitchell
Assistant Examiner—Andrew C. Pike
Attorney, Agent, or Firm—Varnum, Riddering, Schmidt & Howlett

[57] ABSTRACT

An attachment system for pickup bed covers as well as a tonneau cover construction and a collapsible canopy for pickup beds are disclosed. The attachment system includes attachment rails which are affixed to a top of the sidewalls of the pickup bed. The attachment rails have a depending lip which defines a narrow bight that extends along one edge of the rail. A narrow thin resilient fastener strip sewn along an edge of the pickup bed covers is folded inwardly and inserted in the bight to secure the covers to the rail. The front edge of each cover is attached to the pickup bed with a hook and loop fastener, and the rear edge is attached to the tailgate with a rubberized magnetic strip. The tonneau cover incorporates the attachment system. The collapsible canopy is supported by a foldable framework that includes first and second X-shaped frames having two U-shaped ribs pivotably connected by a scissor-type joint. The frames fold forwardly to a front of the pickup bed to permit unobstructed access to the sides and rear of the bed.

11 Claims, 4 Drawing Sheets

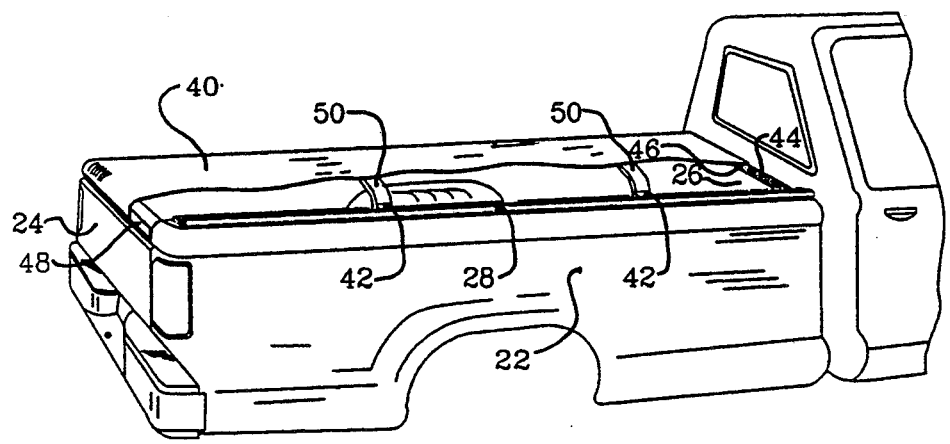
FIG 2
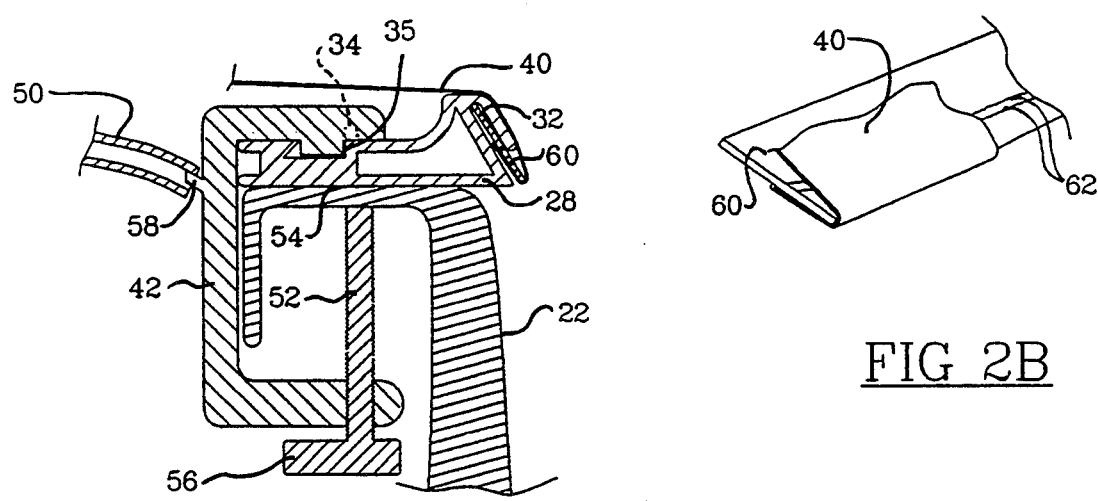
FIG 2A
FIG 2B

PICKUP TRUCK BED COVERS AND ATTACHMENT SYSTEM THEREFORE

FIELD OF THE INVENTION

The present invention relates to accessory equipment for vehicles having an open topped cargo bed and, in particular, to covers for the cargo bed of such vehicles and an attachment system for the covers.

BACKGROUND OF THE INVENTION

Vehicles having open topped bed such as pickup trucks and the like provide a versatile means for transporting and storing a variety of goods. The disadvantage of an open topped bed is that it is exposed to the elements. It has long been recognized as desirable to provide a cover for the bed of such vehicles to prevent the intrusion of rain and snow and protect goods being transported or stored in the vehicle. Many different covers have been invented to satisfy this need. The following patents are known to relate to covers and cover attachment systems for pickup beds:

U.S. Pat. No. 3,727,972-Belk
U.S. Pat. No. 3,857,601-Robbins
U.S. Pat. No. 4,036,521-Clenet
U.S. Pat. No. 4,252,362-Campbell
U.S. Pat. No. 4,273,377-Alexander
U.S. Pat. No. 4,479,677-Gulette et al.
U.S. Pat. No. 4,573,730-Gondert et al.
U.S. Pat. No. 4,639,033-Wheatley
U.S. Pat. No. 4,709,956-Bowman
U.S. Pat. No. 4,730,866-Nett
U.S. Pat. No. 4,792,179-Stevens
U.S. Pat. No. 4,792,178-Kokx
U.S. Pat. No. 4,838,602-Nett
U.S. Pat. No. 4,861,092-Bogard
U.S. Pat. No. 4,833,305-Horton
U.S. Pat. No. 4,979,776-Schweickert
U.S. Pat. No. 4,991,640-Verkindt et al.
U.S. Pat. No. 5,058,652-Wheatley et al.

Cargo bed covers can be divided into two general categories: the rigid canopy and the flexible cover. The rigid canopy is generally made of fiberglass, plywood or some other durable rigid material. While such canopies have become widely accepted, they have certain drawbacks in that they are heavy and therefore difficult to install and remove. Once installed on a vehicle they are rarely removed. Rigid canopies therefore limit the carrying capacity of a vehicle on which they are installed. Articles taller than the distance between the bed and the top wall of the canopy cannot be transported. Rigid canopies also limit the load access to the vehicle since goods can only be loaded through the rear of the canopy.

It is therefore desirable to have a flexible cover which can be removed or collapsed as the need arises. Flexible covers include tonneau covers, a flat flexible cover attached to a perimeter of the top edge of the cargo bed, and flexible canopies which may or may not be collapsible.

The attachment of a flexible cover to a pickup bed is recognized as a difficult engineering exercise. Manufacturing tolerances permit variations in the size of pickup beds, which variations must be compensated for by the attachment system. In addition, the dimensions of a pickup bed change slightly with fluctuations in temperature, as do the dimensions of a flexible cover for the pickup bed. A good attachment system must therefore compensate for such variations so that the cover for the pickup bed remains taut under a variety of conditions which change with time. The covers must also be securely fastened, especially covers for vehicles used in the northern regions where snow accumulations are common. Snow loads can exert significant loads on a cargo bed cover and the attachment system must be able to resist those loads without damaging the cover or attachments.

Many tonneau covers are attached to pickup beds using snap or button fasteners that are affixed directly to the sidewalls of the pickup bed. Such attachment systems have certain drawbacks. Snap fasteners tend to freeze and/or corrode and the resultant stress induced when removing the cover can damage it. Button fasteners, while more reliable, may provide a path for the intrusion of water into the bed and the grommets required in the cover form weak points which tend to tear under stress. In addition, unless snap or button fasteners are affixed to adjustable rails, such fasteners provide no means of compensating for fluctuation in the dimensions of the box or of the cover as a result of temperature changes and/or aging of the cover fabric.

Furthermore, attachments which require the drilling of holes in a vehicle depreciate the value of the vehicle and accelerate corrosion. It is desirable to provide an attachment for a flexible cover which obviates a requirement for piercing the vehicle body. Such systems have been invented and generally comprise a rail which is clamped or glued to the sidewalls of the pickup bed. Some rails include an outwardly extending edge for receiving a J-shaped fastener, or for engaging a bight formed by a strip sewn along an edge of the cover. A system of the first type is taught by Wheatley et al. in U.S. Pat. Nos. 4,639,033 and 5,058,652. A system of the second type is taught by Stevens in U.S. Pat. No. 4,792,179.

Wheatley et al. teaches a mounting system for a tonneau cover which uses a J-shaped extruded fastener that is sewn along the edge of the cover for fastening it to outwardly extending longitudinal edges of rails clamped on the vehicle sidewalls. The J-shaped fasteners is said to compensate for dimensional changes in the cover due to temperature fluctuations or manufacturing tolerances, etc. One disadvantage of this system is that the stress on the cover is concentrated at the seams which affix the cover to the fastener. In addition, the J-shaped fastener is designed to unfurl under tension to compensate for variations in distance between tile cargo box sidewalls, and variations in the flexibility of the cover. It is assumed that under significant load, such as snow load, the cover could unfurl from the rail and collapse into the bed of the vehicle.

Stevens teaches a flexible truck bed cover which is attached to the truck bed by means of a plastic strip sewn onto the cover so that a sewn edge of the strip is adjacent an edge of the cover and a free edge of the strip is spaced inwardly from the edge of the cover. The plastic strip fits inside a gap at the top of the bed created between an attachment rail and a supporting frame or a bed liner. A disadvantage of this system is that pressure on the cover is applied directly to the seam which attaches the plastic strip to the cover. The attachment rail acts as a wedge which acts to separate the cover from the plastic strip. Although increased tension on the cover, such as snow load, tends to lock the cover more firmly in it's attachment to the truck bed, increased pressure tends to damage the cover because of pressure on the seam.

It is therefore apparent that there still exists a need for an attachment system which securely yet removably attaches a cover to the vehicle while compensating for dimensional changes and minimizing points of stress and wear.

There also exists a need for an attractive, lightweight, reliable, collapsible canopy for a pickup bed. Horton in U.S. Pat. No. 4,833,305 discloses a collapsible canopy for pickup trucks which includes a pair of channel members for mounting on the top sidewalls of the pickup box, slide members for reciprocal movement in the channels and rigid stays affixed to the slide members for supporting a flexible canopy. The canopy is collapsed by sliding the rigid stays to a front of the pickup bed. This canopy has certain drawbacks. The channel members are difficult to keep clean, especially if materials such as earth or crushed rock are hauled. Accumulations of dirt and debris interfere with the reciprocal motion of the slide members and make operation of the canopy difficult. Besides, moving a rigid stay in parallel channels is generally difficult as one side or the other tends to jamb. A lack of a continuous attachment for the side edges of the canopy is also a disadvantage since snow and rain can be blown under the edges.

There exists a need for a collapsible canopy for a pickup bed which covers the entire bed, is substantially weathertight along all edges and readily collapses to permit free access to substantially the entire bed.

SUMMARY OF THE INVENTION

It is an object of the present invention to provide an attachment system for flexible covers mounted to the pickup bed of vehicles such as pickup trucks which overcomes the disadvantages of the prior art.

Other objects of the invention include:

providing an attachment system which does require the drilling of any holes in the vehicle body;

providing an attachment system which securely attaches the cover to the vehicle while compensating for dimensional variations in the distance between the cargo box and the sidewalls as well as variations in the flexibility of the cover;

providing an attachment system which will not detach under a load placed on the flexible cover; and providing an attachment system which minimizes stress points where the flexible cover is attached to the cover fastener.

In accordance with a further aspect of the invention, it is an object of the invention to provide a collapsible canopy for pickup trucks which is strong, roomy, and readily collapsible from a deployed position over the bed to a collapsed position at a front of the bed to permit the bed to be unencumbered when free access to the bed from above or the sides is required.

In accordance with the first aspect of the invention there is provided an attachment system for removably securing a flexible cover to the perimeter of the pickup bed of a vehicle such as a pickup truck or the like, said vehicle having a pair of spaced sidewalls, each sidewall having an inturned top edge, comprising a rail having a top wall, a bottom wall, an opposed side edges, the bottom wall being adapted to overlie the inturned top edge of one of the sidewalls, the top wall being adapted to receive a clamp member for affixing the rail to the inturned edge of the side wall, and a side edge of the rail located away from the pickup bed including a depending lip which forms a bight that extends along that side of the rail; and a narrow flat resilient fastener connected along opposite side edges of the flexible cover, the bight being adapted to receive an edge of the fastener, whereby a side edge of the cover is folded inward so that the fastener lies in a plane parallel to the cover and a free edge of the fastener is inserted in the bight to attach the cover to the vehicle.

In accordance with a further aspect of the invention there is provided a collapsible canopy for the pickup bed of a vehicle such as a pickup truck or the like, the pickup bed having a pair of spaced sidewalls, each sidewall having an inturned top edge, comprising:

a flexible cover having a top wall and depending sidewalls;

a rail attachable to the inturned top edge of the sidewalls of the vehicle, said rail defining a downwardly directed bight for receiving a fastener connected to the opposite side edges of the cover; a collapsible framework for supporting the cover, the framework including a first and second pair of U-shaped ribs having a horizontal top section for supporting the top wall of the cover and a support leg which depends from each end of the top section, the support legs of each pair of U-shaped ribs being pivotably interconnected in a scissor joint; and a pivot for pivotably supporting an end of a support leg of each pair of U-shaped ribs, the pivot being located approximate the center of each sidewall of the vehicle, whereby each pair of U-shaped ribs can be folded about the scissor joint to lie in parallel planes and the first and second pair of U-shaped ribs can be rotated about the pivot to lie in parallel planes at a front of the pickup bed.

In accordance with the first aspect of the invention there is provided an attachment system for attaching one of a tonneau cover and/or a flexible canopy to the pickup bed of a vehicle such as a pickup truck. The attachment system includes an extruded rail which may be attached to the sidewalls of the vehicle using C-shaped clamps designed for that purpose. The extruded rail includes a depending lip on one side which defines a bight for receiving a flexible fastener attached to the side edges of the cover. The flexible fastener is preferably a continuous narrow flat resilient plastic strip which is sewn along a side edge of the cover so that the strip projects slightly beyond the cover. To attach the cover to the rail, the cover is folded inwardly so that the fastener lies in a plane which is substantially parallel to the cover. The fastener is inserted in the bight of the rail to secure the cover to the rail.

This attachment system has several advantages. First, the flexible fastener cannot be dislodged from the bight defined by the rail by pressure on the flexible cover. The greater the pressure exerted on the cover, the more tightly the fastener is forced into the bight. Second, the thin flat flexible fastener acts as a spring to tension the cover. Thus the fastener provides a compensating mechanism to correct for variations in the width of a pickup bed as well as changes in dimension of the cover due to temperature variations and/or stretching or shrinking of a cover due to exposure of sunlight or precipitation. Third, the seam which affixes the cover to the fastener is isolated from direct stress because tension on the cover is not transferred directly to the seam. Because the cover is wrapped around the inner edge of the fastener and stress is deflected and absorbed by the resiliency of the fastener and the life of the seam is thereby extended. Fourth, the seam is not exposed to the elements or to view, obviating any requirement for waterproofing and providing a neater, trim appearance.

A further problem with prior art attachment systems has been the attachment of a cover to tile end walls of a pickup bed. Many different methods have been used with more or less success. It has been determined that if the side edges of the cover are securely affixed to the sidewalls of the pickup bed, minimal force is required to retain the end edges in position. In a preferred embodiment in accordance with the invention the front edge of the cover is attached to the front wall of the pickup bed using strips of hook and loop fastener. The rear end of the cover is affixed to the tail gate using a rubber coated magnetic strip which adheres to the metal of the tailgate. The novel use of these attachments obviates providing an attachment bow at the rear of the bow. An attachment box can mar the tailgate, obstruct access and otherwise be difficult to maintain. It also obviates any necessity for defacing the tailgate with adhesive or mechanical fasteners.

In accordance with a further aspect of the invention there is provided a collapsible canopy which includes a simple sturdy collapsible frame that supports a cover having a top wall and depending sidewalls. The collapsible frame includes a first and second pair of inverted U-shaped ribs that are hingedly interconnected by a scissor joint so that in a deployed condition the ribs form two adjacent X-shaped frames which support the canopy over the pickup bed and in a collapsed condition the ribs and the cover are folded to a U-shaped configuration at a front of the pickup bed to permit substantially unobstructed access thereto. This is accomplished by pivotably connecting the two pairs of ribs to a central pivot clamp which is supported by a center of each rail. An end of one leg of each pair of ribs is affixed to the clamp. This permits the canopy to be moved from an erected to a collapsed condition in a very short period of time, providing a collapsible canopy which is practical and convenient to use.

BRIEF DESCRIPTION OF THE DRAWINGS

The invention will now be further explained by way of example only and with reference to the following drawings wherein:

FIG. 2 is a partially cut-away perspective view of a tonneau cover attached to the pickup truck bed using an attachment system in accordance with the invention;

FIG. 2A is a detailed cross-sectional view of a clamp used to attach the rail shown in FIG. 1 to the sidewall of the pickup box;

FIG. 2B is a perspective view of an end portion of a fastener used in the attachment system in accordance with the invention showing a small cut-away portion of the cover illustrated in FIG. 1 and a preferred attachment of the cover to the fastener;

DESCRIPTION OF THE PREFERRED EMBODIMENT

Figure 1:
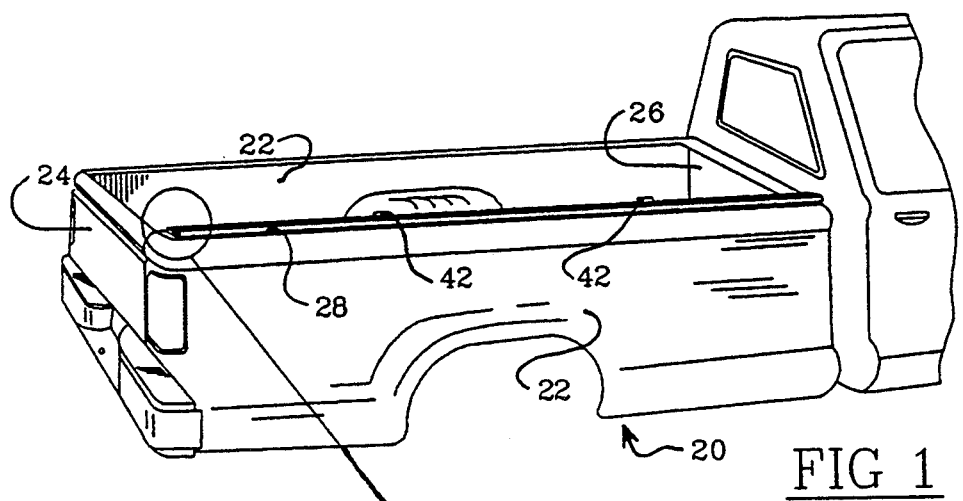
FIG. 1 is a perspective view of a pickup bed having a rail of an attachment system in accordance with the invention affixed to one sidewall of the bed.

FIG. 1 shows a perspective view of a typical pickup truck bed, commonly referred to by reference 20. The pickup truck bed is surrounded by sidewalls 22, a tailgate 24 and a front end wall 26. Attached to one sidewall 22 is an attachment rail 28 which is retained in position by C-clamps 42 as will be explained in more detail with reference to FIGS. 2 and 2A. In a normal installation an attachment rail 28 is attached to each sidewall 22 of the pickup bed.

Figure 1A:
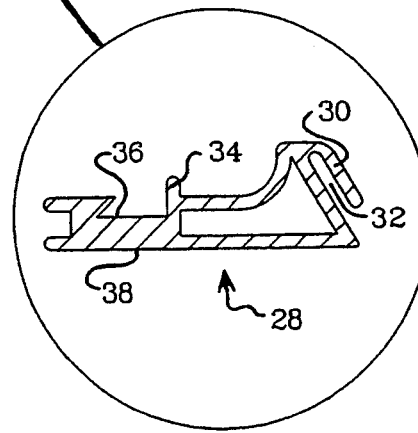
FIG. 1A is a detailed cross-sectional view of the rail shown in FIG. 1.

FIG. 1A shows a detailed cross-sectional view of the attachment rail 28. The attachment rail is preferably extruded from aluminum although other durable materials may also be used. The attachment rail has a depending lip 30 along one edge which forms a bight 32 for receiving a flexible fastener, as will be explained in some detail with reference to FIGS. 2A and 3A. The attachment rail 28 also preferably includes an upstanding ridge 34 and a trapezoid-shaped channel 36, the function of which will also be explained with reference to FIGS. 2A and 3A. The attachment rail 28 has a bottom wall 38 which mates with a top edge of the sidewalls 22 of the pickup truck bed 20 (see FIG. 1).

FIG. 2 shows a partially cut-away perspective view of a tonneau cover 40 installed on the pickup truck bed 20. The tonneau cover 40 is customarily made from a water-proof vinyl or canvas material. Such covers and their construction are well known in the art. The tonneau cover 40 is attached to the perimeter of the pickup bed 20. The tonneau cover 40 is attached to the side edges using the attachment rails 28. The tonneau cover 40 is attached to the front end wall 26 by an opposed pair of hook and loop fasteners 44, 46. The loop strip of the fastener 44 is preferably adhesively attached to the front end wall 26 while the hook fastener 46, is sewn to the front edge of the tonneau cover 40. Alternatively, either of the hook and loop fastener may be adhesively applied to the front surface (not illustrated) of the front end wall 26 between the pickup cab and the pickup box and the tonneau cover 40 may be long enough to wrap over that edge to secure the cover to the front end wall 26. A rubberized magnetic strip 48 is sewn to the rear edge of the tonneau cover. The magnetic strip 48 adheres the rear end of the tonneau cover to the pickup bed. Such rubberized magnetic strips are widely used in refrigeration applications and are commonly available. The advantage of this attachment is that the tailgate 24 is readily opened by lifting the rear edge of the tonneau cover away from its adhesion to the tailgate and then opening the tailgate. No holes are drilled in the tailgate, no adhesives mar the tailgate and no bows obstruct access to the rear end of the pickup bed. In addition, there is nothing to dislodge or wear and the rubberized magnetic strip 48 does not mar or scratch the tailgate as long as it is maintained in a clean condition. The tonneau cover 40 is preferably supported by a pair of crossbows 50 which engage tongues on C-clamps 42 as will be explained with relation to FIG. 2A. Cross bows 50 are preferably box beams extruded from a flexible material such as aluminum or plastic, the construction of which is well known in the art.

FIG. 2A shows a cross-sectional view of the upper portion of sidewall 22 at a rail attachment clamp 42. As is apparent, attachment clamp 42 secures the attachment rail 28 to a top edge of the sidewall 22. The attachment is accomplished using a turn screw 52 which engages inwardly extending top edge 54 of sidewall 22. The turn screw 52 is manipulated using a turn screw handle 56 which slideably accommodates the turn screw so that the clamp may be operated in close proximity to sidewall 22. The position of the rail attachment clamp 42 is preferably governed by a notch 35 in the ridge 34 of attachment rail 28 (see FIG. 1A) the notch 35 is machined to accept the top jaw of the rail attachment clamp 42. Using this method, the rail attachment clamps are automatically located in proper position for securing the attachment rail 28 to the sidewall 22. The rail attachment clamp also preferably includes a projecting tongue 58 which is cast as an integral component of the clamp. The tongue 58 provides an attachment for the cross bows 50 which support the tonneau cover 40. The hollow cross bows readily slip over an end of tongue 58 and are securely retained thereby. Cross bows 50 are flexible enough that they are readily maneuvered into position. The tonneau cover 40 is attached to the side rail 28 by folding a free side edge of the cover inwardly until a thin flat resilient plastic fastener 60 is parallel with the cover. The fastener is then inserted in the bight 32 of the attachment rail 28. Once inserted, the plastic fastener 60 cannot dislodged from the bight 32 unless it is pulled downwardly out of the bight. Any pressure such as snow load or the like on tonneau cover 40 simply seats the fastener 60 deeper in bight 32.

FIG. 2B shows the construction of the fastener 60. The fastener 60 is preferably a thin plastic strip of high density polyethylene having a durometer hardness of approximately 60 d. actual. Other plastics having approximately the same flexibility are equally satisfactory for this application. The plastic fastener 60 is preferably about 3 cm wide. It is preferably sewn to the tonneau cover 40 using a double seam as shown in FIG. 2B. The plastic fastener 60 preferably extends about a centimeter beyond the edge of the tonneau cover 40. The fastener 60 has several distinct advantages. First, because the fastener 60 is folded inwardly so that it is parallel with an inner side of tonneau cover 40 (see FIG. 2A) the seams 62 which attach the tonneau cover 40 to the plastic fastener 60 are hidden from view. This gives the tonneau cover a neat trim appearance which is not provided by any other known attachment system. Second, because of the U-shaped configuration of the attachment in use, stress on seams 62 is minimized since there is no direct force on the seam and most force resulting from pressure on tonneau cover 40 is absorbed by the resiliency of plastic fastener 60. Third, the seams 62 are not exposed to ultraviolet radiation or abrasion and therefore wear less quickly. Finally, the plastic fastener 60 will not unintentionally disengage the bight 32.

Figure 3:
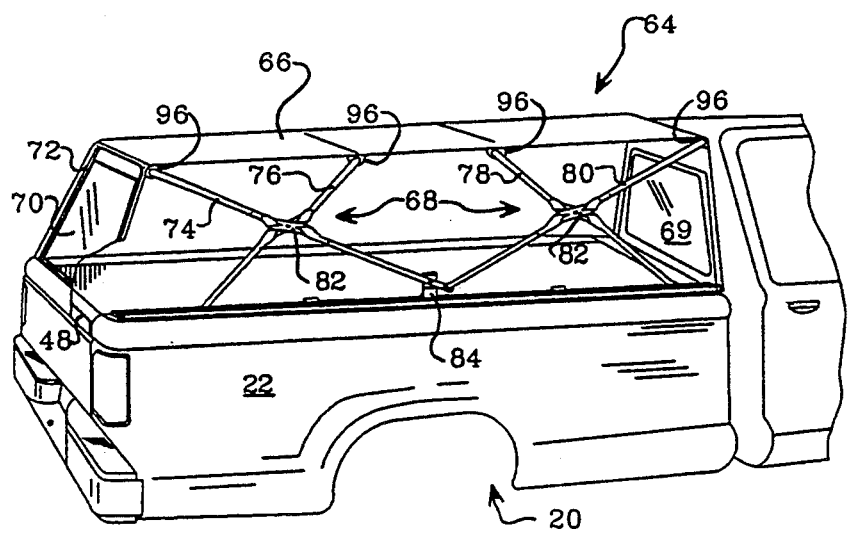
FIG. 3 is a partially cut-away perspective view of a collapsible canopy in accordance with the invention.

FIG. 3 shows a cut-away perspective view of a collapsible canopy in accordance with a further aspect of the invention. The collapsible canopy, generally referred to by reference 64 includes a flexible cover 66 made from a water-proof vinyl or the like and a collapsible framework 68 which includes first and second pairs of U-shaped support ribs that are hingedly connected together. The flexible cover 66 preferably includes clear vinyl window panels 69, 70 in the front and rear ends respectively of the flexible cover 66. Window panels 69, 70 are preferably attached to the flexible cover 66 by zipper fasteners 72 that permit the window panels to be readily removed. The front and rear ends of the flexible cover 66 are preferably attached to the respective end walls of the cargo bed by hook and loop fasteners 44, 46 (see FIG. 2) in the front and a rubberized magnetic strip 48 in the rear, as explained above in relation to the tonneau cover described in the description of FIG. 2.

As noted above, the flexible cover 66 is supported by collapsible framework 68. The framework includes four U-shaped support ribs 74, 76, 78 and 80. Each U-shaped support rib has a horizontal top portion and a depending support leg which is divided into first and second sections. For purposes of clarity only one side of the collapsible framework 68 is illustrated, the opposite side being a mirror image of the side illustrated. Located between the first and second section of each pair of support ribs is a scissor-type joint 82 which is shown in more detail in FIG. 3D. The scissor joint 82 permits the collapsible framework 66 to lie flat in a folded condition as will be explained in relation to FIG. 4.

Figure 3B:
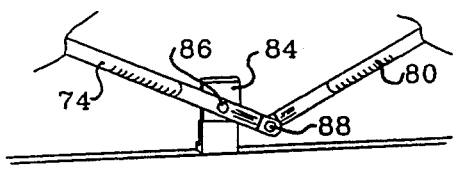
FIG. 3B is a side elevational view of the attachment of the collapsible framework to the clamp shown in FIG. 3A.

As is illustrated in FIG. 3, the U-shaped support rib 74 is pivotably connected to the U-shaped support rib 80. A detailed view of that connection is shown in FIGS. 3B and 3C. A center of the collapsible framework 68 is pivotably supported by a center pivot clamp 84 which is shown in cross-sectional view in FIG. 3A. The center pivot clamp 84 permits the rear portion of the collapsible framework to be pivoted forward to a front of the pickup bed, so that the entire canopy can be folded to a front of the vehicle providing substantially free access to the entire pickup bed. As is apparent, a lower end of support rib 74 extends past the central pivot clamp 84 and the lower end of support rib 80 is pivotably connected thereto. This pivot arrangement pulls the forward portion of the collapsible framework rearwardly to clear a back of the pickup cab. The ends of support ribs 76,78 are preferably covered with plastic caps 98 (See FIG. 4) which fit snugly in the channel 36 of attachment rail 28.

Figure 3A:
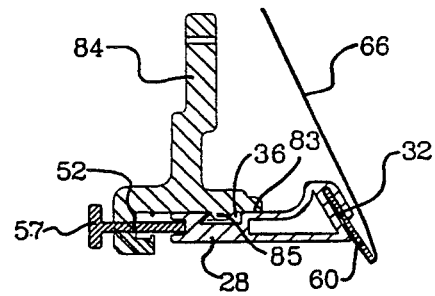
FIG. 3A is a cross-sectional view of a pivot clamp used to pivotably support a center of the collapsible framework which supports the canopy shown in FIG. 3.

FIG. 3A shows a cross-sectional view of the attachment rail 28 at the center pivot clamp 84. The center pivot clamp is attached to the attachment rail 28 by a turn screw 52 which is operated with a knurled knob 57. A wedge shaped portion 85 of center pivot clamp 84 engages the trapezoid-shaped groove 36 in the attachment rail 28. This arrangement securely affixes the center pivot clamp 84 to the attachment rail 28. The position of the center pivot clamp 84 is preferably predetermined by a notch 83 cut in ridge 34 in the attachment rail 28 (see FIG. 1A) so that a correct positioning of the center pivot clamp is assured. The flexible cover 66 is attached to the attachment rail 28 in a manner described above with respect to FIG. 2A by inserting the plastic fastener 60 into the bight 32 in the attachment rail 28.

FIGS. 3B and 3C show detailed views of the construction of the joints at the central pivot clamp 84 and the ends of U-shaped support ribs 74 and 80. FIG. 3B is a side elevational view of the assembly at the center pivot clamp 84. The rear U-shaped support rib 74 is provided with a bore which accepts a pivot pin 86 that passes through a corresponding bore in a top end of the center pivot clamp 84. The end of the U-shaped support rib 74 also has a transversely centered bore which accommodates a rivet pin 88 that passes through a corresponding bore in the U-shaped support rib 80. The end of each of the U-shaped support ribs 74 and 80 includes an offset 90 which permits the support ribs to rotate past each other without interference.

Figure 3D:
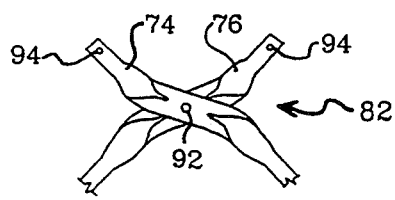
FIG. 3D is a side elevational view of a scissor joint used to pivotably connect the support ribs of the collapsible framework shown in FIG. 3A.
Figure 3C:
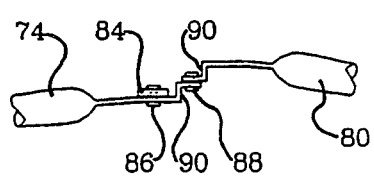
FIG. 3C is a top plan view of the clamp and framework shown in FIG. 3B.

FIG. 3D is a detailed elevational view of the scissor joint 82. Each of the four scissor joints are identical in construction and are preferably stamped from tubing. A top end of a bottom section of each leg is preferably stamped flat and the flat areas are joined by a rivet 92. The free end of each support rib above the joint is provided with a radial bore 94 which accommodates a bullet latch (not illustrated) to connect the U-shaped top portion of each support rib to a respective end. This permits the U-shaped top portion of each rib to be inserted through retainer loops 96 attached to an inner surface of the flexible cover 66 (see FIG. 3).

Figure 4:
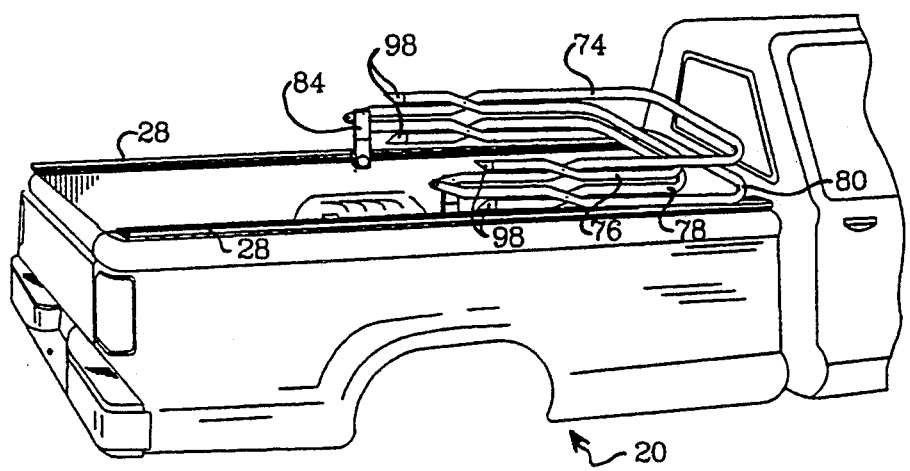
FIG. 4 is a side elevational view of the collapsible framework shown in a folded condition at a front of the pickup box.

FIG. 4 shows the collapsible framework 68 in a folded condition at a front of the vehicle. The flexible cover 66 is not illustrated for clarity. As is apparent, the rear support ribs 74 and 76 fold together and rotate over the center pivot clamp 84 to overlie the front support ribs 78 and 80 which likewise fold together around the scissor joint 82. As noted above, the offset of the pivot point at the rivet 88 pulls the front portion, support ribs 78, 80, rearwardly to clear the pickup cab as the rear portion of the collapsible framework, support ribs 74, 76, is pivoted forwardly over the center pivot clamp 84. This permits the canopy to be folded to the front of the pickup bed when access to the pickup bed from the top and/or the sides is required.

It is apparent from the foregoing that a new and useful attachment system for pickup bed covers and novel covers for pickup beds have been invented. The embodiments hereinbefore described are intended to be exemplary only. Changes and modifications may be apparent to those skilled in the art. The scope of the invention is intended to be limited solely by the scope of the appended claims.

The embodiments of the invention in which an exclusive property or privilege is claimed are defined as follows:

1. An attachment system for removably securing a flexible cover to the perimeter of a bed of a vehicle having a pair of spaced sidewalls, each sidewall having an inturned top edge, comprising:
   rails having a top wall, a bottom wall and opposed side edges, the bottom walls of each rail being adapted to overlie the inturned top edge of a one of the sidewalls, the top wall being adapted to receive a clamp member for affixing the rails to the respective inturned edge of the sidewall, and a side edge of the rails located away from the bed including a depending lip which forms a bight of consistent width and depth that extends along that side of the rails; and
   a flat resilient fastener for securing the flexible cover to the rails, the fastener having opposed first and second longitudinal edges, a length of the fastener being connected along each side edge of the flexible cover, the bight being adapted to receive the first longitudinal edge of the fastener but the fastener being wider than the depth of the bight so that the second longitudinal edge of the fastener is spaced from an end of the depending lip when the first edge is received in the bight whereby a side edge of the cover is folded inwardly so that the fastener lies in a plane parallel to the cover, the first edge of the fastener is inserted in the bight to attach the cover to the vehicle, and the fastener acts as a spring to tension the cover, and the rails include a ridge which extends along the top wall and the ridge is notched to locate the clamp member at a location appropriate for attaching the rail to the sidewall of the bed.

2. A collapsible canopy for the bed of a vehicle having a pair of spaced sidewalls, each sidewall having an inturned top edge, comprising:
   rails attachable to the respective inturned top edges of the sidewalls of the vehicle, said rails respectively defining a downwardly directed bight for receiving a fastener connected to each side edge of the canopy;
   a collapsible framework for supporting the canopy, the framework including a first and second pair of U-shaped ribs, the first pair being located at a front of the bed and the second pair being located at a rear of the bed, each rib having a horizontal top section for supporting a top of the flexible cover and a support leg which depends from each end of the top section, the support legs of each pair of the U-shaped ribs being pivotably interconnected by a scissor joint in an X-shaped arrangement; and
   a pivot for pivotably supporting an end region of a forwardly extending support leg of the second pair of the U-shaped ribs, the pivot being located approximate the center of each sidewall of the vehicle, an end of a rearwardly extending support leg of the first pair of U-shaped ribs being pivotally attached to an end of the forwardly extending support leg of the second pair, and an end of the other support leg of each pair of U-shaped ribs resting on a one the rails when the U-shaped ribs are in a position for supporting the canopy, whereby each pair of U-shaped ribs may be folded about the scissor joint to lie in parallel planes and the first and second pair of U-shaped ribs may be pivoted about the pivot to lie in parallel planes at a front of the bed in a collapsed position.

3. The collapsible canopy as claimed in claim 2 wherein the pivot comprises a pivot clamp which is attached to each of the respective rails.

4. The collapsible canopy as claimed in claim 3 wherein the position of the pivot clamp is determined by a notch cut in a ridge which extends longitudinally of a top surface of the rail.

5. The collapsible canopy as claimed in claim 2 wherein the canopy includes a flexible window panel in each of a front wall and a rear wall thereof.

6. The collapsible canopy as claimed in claim 5 wherein each window panel is attached to the canopy with a zipper fastener so that the panels are removable.

7. The collapsible canopy as claimed in claim 2 wherein a front wall of the canopy is attached to the bed with a complementary pair of hook and loop fasteners.

8. The collapsible canopy as claimed in claim 2 wherein a rear wall of the canopy is attached to a tailgate of the vehicle with a flexible magnetic strip.

9. The collapsible canopy as claimed in claim 8 wherein the magnetic strip is coated with a nonabrasive coating.

10. A collapsible canopy for the bed of a vehicle having a pair of spaced sidewalls, each sidewall having an inturned top edge, comprising:

a pair of rails attachable to the respective inturned top edges of the sidewalls of the vehicle, each rail defining a downwardly directed bight for receiving respective fasteners connected along opposed side edges of the canopy;

a self-supporting collapsible framework for supporting the canopy, the framework including a pair of U-shaped ribs located at a front of the bed and a pair of U-shaped ribs located at a rear of the bed, each pair of U-shaped ribs including depending legs which have a top section and a bottom section, the depending legs being crossed in an X-shaped configuration and joined together in a scissor-joint so that the U-shaped frames may be pivoted from a position which is X-shaped in side view to a position wherein the ribs are parallel and juxtaposed;

a pivot for pivotably supporting an end region of a front leg of the rear pair of U-shaped ribs, each end of a rear leg of the front pair of U-shaped ribs being pivotably attached to a respective end of the front leg of the rear pair of U-shaped ribs;

whereby each pair of U-shaped ribs can be folded about the scissor joint to lie in parallel planes and the front and rear pair of U-shaped ribs can be pivoted about the pivot to lie in parallel planes at a front of the bed in a collapsed position.

11. A collapsible canopy as claimed in claim 10 wherein the fastener comprises a thin flat rectangular plastics strip which is attached along each side edge of the canopy, the plastics strip being wider than a depth of the bight and having a free edge so that the plastics strip acts as a spring for tensioning the cover when the free edge of the fastener is inserted into the bight.

* * * * *